United States Patent [19]
Rudy et al.

[11] 3,791,140
[45] Feb. 12, 1974

[54] OPERATION OF HYBRID ROCKET SYSTEMS

[75] Inventors: Thomas P. Rudy; Raymond J. Muzzy, both of Saratoga, Calif.

[73] Assignee: The United States of America as represented by the Secretary of the Air Force, Washington, D.C.

[22] Filed: May 12, 1972

[21] Appl. No.: 252,692

[52] U.S. Cl............. 60/207, 60/208, 60/219, 60/220
[51] Int. Cl............................................. C06d 5/10
[58] Field of Search ...... 60/219, 220, 207, 208, 209

[56] References Cited
UNITED STATES PATENTS

| | | |
|---|---|---|
| 3,717,997 | 2/1973 | Ayers et al............... 60/220 |
| 3,640,070 | 2/1972 | Kaufman et al. ......... 60/220 |
| 3,698,191 | 10/1972 | Ebeling................... 60/219 |
| 3,626,698 | 12/1971 | Baum...................... 60/207 |

Primary Examiner—Benjamin R. Padgett

[57] ABSTRACT

In the operation of a hybrid rocket system, a solid fuel consisting essentially of a polybutadiene, trimethylolpropane trimethacrylate, polymethylmethacrylate and an organic peroxide is burned in a combustion zone in the presence of an oxidizer that is supplied to the zone at varying flow rates. Because the solid fuel burns without char formation at low oxidizer to fuel ratios, it is possible to operate the system over a wide thrust range.

4 Claims, 1 Drawing Figure

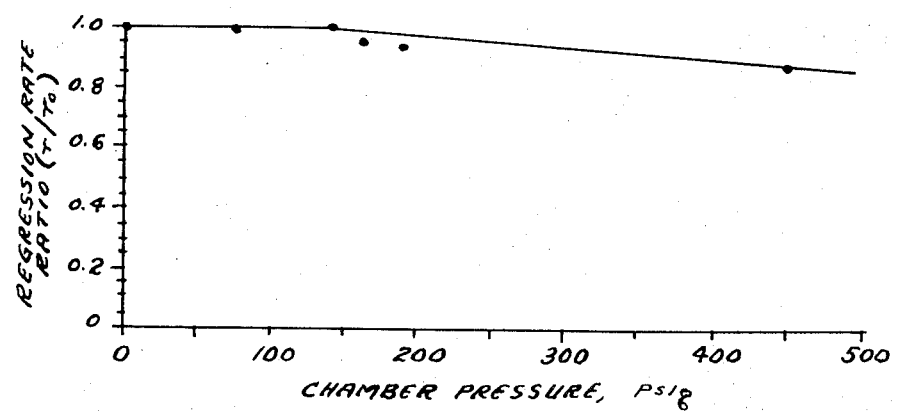

OPERATION OF HYBRID ROCKET SYSTEMS

FIELD OF THE INVENTION

This invention relates to a method of operating a hybrid rocket system. In one aspect it relates to a solid fuel that is particularly useful in the operation of hybrid rocket systems, especially air-augmented rocket systems.

BACKGROUND OF THE INVENTION

A conventional hybrid rocket system utilizes a liquid or gaseous oxidizer, such as oxygen, or an oxygen donor, such as nitrogen peroxide, and a solid fuel. The solid fuel is generally a hydrocarbon polymer to which other fuel elements, e.g., aluminum powder, may be added. Such systems are potentially capable of operating over a wide thrust range by merely varying the amount of oxidizer flowing through the fuel grain port within the thrust chamber assembly. However, in actual practice this wide range of operation is not possible since degradation of the hybrid fuel occurs at low oxidizer flow rates and results in the formation of a carbonaceous layer and drastically reduces further fuel regression. As a result, a severe limitation has been placed on the design of many hybrid systems. This latter statement is particularly applicable to air-augmented target missiles which have a primary generator operating at low flow rates and low oxidizer to fuel ratios to provide a fuel-rich gas to be burned in a secondary chamber with atmospheric air scooped up in flight.

It is an object of this invention, therefore, to provide a solid fuel that is not subject to the above-discussed disadvantages when used in hybrid rocket systems.

Another object of the invention is to provide a hybrid fuel that is particularly useful in the operation of air-augmented target missiles.

A further object of the invention is to provide a method for operating a hybrid rocket system.

Still another object of the invention is to provide a method for operating an air-augmented target missile.

Other objects and advantages of the invention will become apparent to those skilled in the art upon consideration of the accompanying disclosure and the drawing which is a graph of data obtained in the practice of the method of this invention.

SUMMARY OF THE INVENTION

Broadly speaking, the present invention resides in a method of operating a hybrid rocket system which comprises burning a solid rocket fuel in a combustion chamber in the presence of an oxidizer supplied to the chamber in varying amounts, the solid fuel consisting essentially of a polybutadiene, trimethylolpropane trimethacrylate, a polymethacrylate and an organic peroxide. When proceeding in accordance with this method, it has been discovered that varying the amount of oxidizer does not result in char formation so that the rocket can be operated over a wide thrust range. This was an unexpected result since conventional solid rocket fuels on burning at low oxidizer to fuel ratio tend to char, thereby rendering unsatisfactory the operation of hybrid rocket systems.

In a preferred embodiment, the invention resides in a method of operating an air-augmented rocket system. In accordance with this method, a fuel-rich gas is generated by burning the above-described solid fuel with an oxidizer at a low oxidizer to fuel ratio in a primary generator or combustion zone. The fuel-rich gas so generated is thereafter burned in a secondary combustion zone with atmospheric air scooped up in flight.

The various components used in formulating the solid fuel have been mentioned hereinabove. As the polybutadiene, it is preferred to use a cis-polybutadiene, e.g., one containing from about 80 to 98 percent cis 1,4-unsaturation. However, it is within the scope of the invention to employ high trans- or 1,2-polybutadienes. The polybutadiene functions both as a fuel and as a vulcanizable elastomer. Thus, the elastomer provides a strong, elastic matrix for the acrylic resin prior to combustion while upon combustion it contributes to the generation of both heat and working fluid (exhaust gases).

The trimethylolpropane trimethacrylate (TMPTMA), an important component of the fuel composition, is the ester obtained by condensing three mols of methacrylic acid with one mol of 2-ethyl-2-(hydroxymethyl)-1,3-propandiol. Since each TMPTMA molecule contains three double bonds which are very reactive in peroxide vulcanization, the ester acts to increase crosslink density, thereby increasing both the tensile modulus and resistance to melting of the cured fuel.

While it is preferred to utilize polymethylmethacrylate in the fuel formulation, it is within the purview of the invention to use other polymethacrylates, such as polyethylmethacrylate, polybutylmethacrylate and the like. It is not intended to limit the invention to any particular theory, but it does not appear that the polymethacrylate participates in the cure reaction. Rather, the polymer appears to serve as a solid fuel component which pyrolyzes cleanly during combustion, thereby contributing to the suppression of char formation.

An organic peroxide is utilized as the curing agent. Because of their stability at the relatively high temperatures preferably used in the mixing and vulcanization steps, it is preferred to use dicumyl peroxide or $\alpha,\alpha'$-bis(t-butylperoxy)diisopropylbenzene as the curing agent. However, other less stable organic peroxides, such as dibenzoyl peroxide, can be employed by conducting the mixing and vulcanization steps at lower temperatures.

The components of the solid fuel composition are compounded by mixing with any suitable mixing apparatus such as a Banbury mixer or a roll mill. The mixing is conducted at a temperature below 250°F. With the preferred stable curing agents, the mixing temperature can be of the order of about 200° to 250°F although lower temperatures can, of course, be employed. When using less stable organic peroxides, the mixing is accomplished at lower temperature, e.g., in the range of about 100° to 120°F.

While as a general proposition the ingredients can be added in any order during the mixing operation, it is usually preferred as a matter of convenience to add the polybutadiene first. The organic peroxide is generally added last since the chance of scorch occurring is thereby minimized.

The mixing operation is conducted for a period of time sufficient to provide a homogeneous mixture. This period of time will depend upon several factors, including the size of the batch, the type of equipment used and the mixing temperature. The amounts of the several ingredients in the fuel composition usually fall in the ranges shown in the following listing:

| | Weight percent |
|---|---|
| A. Polybutadiene | 65–85 |
| B. Trimethylolpropane trimethacrylate | 10–15 |
| C. Organic peroxide | 1–3 |
| D. Acrylic polymer | 0–20 |
| | 100 |

While the above formulation indicates that an acrylic polymer need not be present, it is preferred to include the material, particularly polymethylmethacrylate, because its presence favors the suppression of char formation. However, the amount of the polymer used should not exceed the indicated amount because it does have a low heating value as compared to polybutadiene.

It is also within the scope of the invention to include a filler or fillers in the form of a powder in the fuel formulation. Examples of one type of filler that can be added to increase the heat released during combustion include carbon and metals such as aluminum, magnesium and boron. Other fillers well known in the art may also be added for various reasons, e.g., to aid ignition and combustion, and to improve storage life.

After the compounding is completed, the resulting fuel composition is cured. When using stable curing agents, the vulcanization is usually accomplished by heating the uncured composition at a temperature in the range of about 275° to 350°F for a period of about 0.5 to 2 hours. If the less stable curing agents are used, lower curing temperatures are employed, e.g., temperatures in the range of about 175° to 225°F. In one procedure for producing a fuel grain, standard rubber manufacturing techniques are employed. For example, annular billets are prepared by pressure molding, e.g., at a pressure ranging from about 250 to 750 psi, under the above-described vulcanization conditions. The billets are then merely stacked in the combustion chamber of the rocket motor. Fuel grains can also be prepared by extrusion. Curing of the grains is accomplished after they are formed or cast by heating under the above-specified temperature conditions. The size and shape of the grain is determined entirely by ballistic design to accomplish the specific thrust program required to fulfill the mission of the missile.

In the operation of a hybrid rocket, the oxidizer flow into the combustion chamber containing the fuel is controlled, thereby making it possible to operate the rocket over a wide thrust range. This control is usually accomplished after ignition by utilizing a simple valve between the pressurized oxidizer tank and the oxidizer injector which is electrically actuated by a preprogrammed on-board timer or by radio command.

In general, the operating pressure of a hybrid rocket combustion chamber ranges from about 50 to 2,000 psi with a pressure in the range of about 200 to 1,000 psi being usually employed. In air-augmented rocket systems in which the fuel is burned in a primary gas generator, the normal chamber pressure ranges from about 50 to 200 psi. The low pressure requirement is based upon the need for a low flow rate of hot fuel-rich gas that is subsequently burned in a secondary chamber with atmospheric air to provide the desired thrust. When burning of the fuel is conducted at low oxidizer flow rates and concomitantly at low oxidizer to fuel ratios in order to obtain the low chamber pressure, any char formation on the fuel grain surface interferes with further combustion. The method of this invention provides a solution to this problem in that the solid fuel described hereinabove burns at low combustion chamber pressures without the formation of a char layer. The oxidizer to fuel ratios required to obtain the low combustion chamber pressures will depend upon the size and design of the fuel grains. However, the ratio is less than the stoichiometric design ratio required for maximum total thrust.

Any of the well known liquid or gaseous oxidizers can be employed in the practice of the method of this invention. Examples of suitable oxidizers include oxygen per se, or an oxygen donor, such as nitrogen peroxide or hydrogen peroxide. The fuel is ignited by means that are well known in the art. An example of a suitable ignition means is a hot gas igniter.

A more complete comprehension of the invention can be obtained by referring to the following illustrative examples which are not intended, however, to be unduly limitative of the invention.

EXAMPLE I

A solid fuel was prepared for use in the method of this invention by compounding the components shown in the following recipe:

| Components | Parts by weight | Weight percent |
|---|---|---|
| 98 percent cis-polybutadiene[1] | 100.0 | 67.2 |
| Trimethylolpropane trimethacrylate[2] | 16.5 | 11.1 |
| Polymethylmethacrylate[3] | 30.0 | 20.0 |
| α, α'-bis(t-butylperoxy)diisopropylbenzene[4] | 2.5 | 1.7 |
| | 149.0 | 100.0 |

1. Ameripol CB220 (Goodrich Gulf Chemical, Inc.)
2. Sartomer Resin SR350 (Sartomer Resins, Inc.)
3. Elvacite 2010 (Rohm and Haas)
4. Vulcup-R (Hercules, Inc.)

The components were mixed in a Banbury mixer at a temperature below 250°F. The cis-polybutadiene was added first followed by addition of the polymethylmethacrylate and trimethylolpropane trimethacrylate. The organic peroxide curing agent was added last. After the components were thoroughly mixed, the resulting homogeneous mixture was cured. Thus, annular billets of the compounded mixture having a thickness of about 2 inches were pressure molded at 275°F for 1.5 hours under a pressure of 500 psi. After cooling to room temperature, the resulting vulcanized billets were stacked in a 2.5 inch diameter, 12 inch long rocket motor having a 1 inch diameter cylindrical port. A nozzle aft of the fuel grain was used to obtain various chamber pressures while the forward closure contained an injector port for gaseous oxygen, the oxidizer.

Ignition of the fuel was obtained with a hot gas igniter. The motor was fired for a specific length of time at a constant oxidizer flow rate. The total weight loss was used to obtain the average regression rate which was then recorded as a function of the average oxidizer mass flux $G_o$, i.e., oxidizer flow rate divided by average port area. The reference regresssion rate $r_o$ equaled 0.0055 in/sec when $G_o$ equaled 0.007 lbs/in$^2$ sec.

Referring to the drawing, the curve is a plot of the data obtained that shows the regression rate ratio (regression rate $r$ at various pressures divided by the reference regression rate $r_o$) as a function of the chamber pressure for the average oxidizer mass flux $G_o$. The test results as represented by the curve show that by proceeding in accordance with the method of this invention a high regression rate, which remains substantially constant until high pressures are reached, was obtained. In summary, the data demonstrate that in the test of Example I a char layer does not form until very high pressures are reached. Thus, the present invention provides an improved method for operating a hybrid rocket system.

EXAMPLE II

Other tests were conducted in which solid fuels were prepared from the following formulations, utilizing essentially the same procedure as described in Example I.

| Component | Weight percent 1 | 2 |
|---|---|---|
| 98 percent cis-polybutadiene | 84.0 | 83.0 |
| Trimethylolpropane trimethacrylate | 13.9 | 13.7 |
| $\alpha,\alpha'$-bis(butylperoxy)diisopropylbenzene | 2.1 | |
| dicumyl peroxide | | 3.3 |
| | 100.0 | 100.0 |

Firing tests similar to those described in Example I were conducted, and the results of the tests were similar to those obtained in Example I.

As will be evident to those skilled in the art, various modifications of this invention can be made in the light of the foregoing disclosure without departing from the spirit or scope of the invention.

We claim:

1. A method of operating a hybrid rocket system which comprises the steps of burning a solid rocket fuel in a primary combustion zone in the presence of a liquid or gaseous oxidizer, the rocket fuel consisting essentially of a homogeneous, cured mixture of 65 to 85 weight percent of polybutadiene, 10 to 15 weight percent of trimethylolpropane trimethacrylate, 1 to 3 weight percent of an organic peroxide, and zero to 20 weight percent of a polymethacrylate; varying the amount of oxidizer suppled to the primary combustion zone so that the pressure created therein by burning of the solid rocket fuel is in the range of 50 to 200 psi, thereby producing a fuel-rich gas; and burning the fuel-rich gas in a secondary combustion zone with atmospheric air to provide a desired thrust.

2. The method according to claim 1 in which said polybutadiene is cis-polybutadiene.

3. The method according to claim 2 in which said organic peroxide is dicumyl peroxide, $\alpha,\alpha'$-bis(t-butylperoxy)diisopropylbenzene or dibenzoyl peroxide and said polymethacrylate is polymethylmethacrylate.

4. The method according to claim 1 in which the oxidizer is oxygen, nitrogen peroxide or hydrogen peroxide.

* * * * *